United States Patent [19]

Goede

[11] Patent Number: 4,717,915

[45] Date of Patent: Jan. 5, 1988

[54] METHOD AND APPARATUS FOR THE GRAPHIC REGISTRATION OF MOVING VEHICLES

[75] Inventor: Simon Goede, Wetzikon, Switzerland

[73] Assignee: Zellweger Uster Ltd., Uster, Switzerland

[21] Appl. No.: 800,790

[22] Filed: Nov. 22, 1985

[30] Foreign Application Priority Data

Nov. 30, 1984 [CH] Switzerland .................. 05721/84

[51] Int. Cl.⁴ .............................................. G01S 13/58
[52] U.S. Cl. ...................................... 342/66; 342/106
[58] Field of Search ......................... 342/66, 104, 190

[56] References Cited

U.S. PATENT DOCUMENTS

| | | | |
|---|---|---|---|
| 3,122,740 | 2/1964 | Kruse et al. | 342/66 |
| 3,148,015 | 9/1964 | Weaver | 342/66 X |
| 3,195,126 | 7/1965 | Barker | 342/190 X |
| 3,438,031 | 4/1969 | Fathauer | 342/190 X |
| 3,626,413 | 12/1971 | Zachmann | 342/104 |
| 3,754,253 | 8/1973 | Balsiger | 342/66 |

Primary Examiner—T. H. Tubbesing
Attorney, Agent, or Firm—Burns, Doane, Swecker & Mathis

[57] ABSTRACT

Vehicles are measured and photographed from the direction in which they are travelling by a Doppler radar speed measuring device equipped with a camera. During a measuring stage after the vehicle enters the radar beam, a measured speed value is determined and when this exceeds a specific limit value, the camera is triggered. The Doppler signal for checking the measured speed value is then further evaluated over a verification distance. If the measured speed value is confirmed then it is printed on the photograph at the end of the verification distance, if it has not been confirmed, then a cancellation indicator is printed. The film is then advanced and the detection of the entry of another vehicle is awaited. As a result of this checking of the measured speed value, the measuring reliability when registering oncoming vehicles is substantially increased and overtaking in particular can be detected in the range of the radar beam.

16 Claims, 8 Drawing Figures

METHOD AND APPARATUS FOR THE GRAPHIC REGISTRATION OF MOVING VEHICLES

BACKGROUND OF THE INVENTION

The present invention relates to a method and apparatus for the graphic, particularly photographic, registration of moving vehicles by a Doppler radar speed measuring device equipped with a recording device such as a camera.

More particularly, the present invention combines a Doppler radar speed measuring device with a recording device so that a proper record can be made of cars which exceed the applicable speed limit. After a vehicle enters the measuring beam of the radar device, the vehicle is registered from the direction in which it is travelling and a corresponding measured speed value is determined during a measuring stage. If the measured speed value exceeds a specific threshold value, the recording device is triggered and the measured speed value is printed or superimposed onto the photograph.

German Patent No. 1 805 903 (U.S. Pat. No. 3,754,253) discloses a process for triggering a camera with a Doppler radar speed measuring device, in which the vehicles are measured from behind and photographed. The triggering of the camera is suppressed when the measured speed value cannot be assigned with certainty to a particular vehicle.

Since when surveying and photographing moving traffic from behind a vehicle only the vehicle at fault is identified and not the driver thereof, the practice has recently been adopted of taking a so-called frontal photograph either with or without the photograph from behind, which also makes possible a clear identification of the driver of the vehicle. A suitable device is disclosed, for example in German patent No. 28 02 448.

Thus, either a speed measuring device of the type described in German Patent No. 1 805 903 (U.S. Pat. No. 3,754,253) is positioned at the roadside together with a frontal camera device such as the type described in German Patent No. 28 02 448 coupled to it and the vehicles are measured from behind and photographed both from behind the vehicle and from the front, or a single speed measuring device is used and the vehicles are measured and photographed only from the front.

In the first case, the apparatus becomes more expensive due to the use of two cameras and it also becomes impractical and is only suitable for stationary and not for mobile use. In the second case, the requirement that the vehicle must be photographed as soon as possible after entering the measuring area of the radar device, since otherwise it will leave the field of vision of the camera, means that the determination of the speed value must take place within a relatively short measuring distance. Since the measurement is immediately concluded after the determination of the measuring value, the camera is triggered while the vehicle is still at the beginning of the measuring range of the radar device. Thus, the greater part of the Doppler signal produced as the vehicle travels through the measuring beam remains unevaluated, thereby reducing the measuring reliability.

Thus, for example, a vehicle passing another directly during or after the measurement within the measuring range of the radar device is not detected, since several vehicles are shown on the corresponding photograph in a relatively small area, and the certain allocation of the printed measured speed value to one particular vehicle shown is not possible. So as to avoid incorrect allocation, the evaluation of such photographs having several vehicles at relatively small spacings must be dispensed with. The proportion of those photographs which cannot be evaluated, however, is relatively large in today's heavy traffic.

OBJECTS AND BRIEF SUMMARY OF THE INVENTION

One object of the present invention is thus to increase the measuring reliability of the measuring arrangement preferred today for frontal measurement and photography, that is of oncoming traffic, and to eliminate or at least drastically reduce the number of photographs which cannot be evaluated.

The object is achieved according to the invention in that after the recording device has been triggered, the Doppler signal produced as the vehicle travels through a section of the measuring beam, hereinafter referred to as a verification distance, is further evaluated and the result of this evaluation is used for checking the measured speed value.

Thus, the process according to the invention, despite the necessity of measuring and photographing a vehicle at the beginning of the measuring range of the radar device, enables the evaluation of the whole Doppler signal produced as the vehicle drives through the measuring beam, while the original measured speed value is checked over the verification distance. Overtaking can thereby particularly be detected in the range of the measuring beam.

The invention further relates to a device for carrying out the above process, which device includes a Doppler radar speed measuring device, a computer for evaluating the Doppler signals and a camera having a data printing unit, which is controlled by the computer with a camera-triggering signal, a film advance signal and a data print signal.

The computer, after emitting the camera-triggering signal, checks the measured speed value of the measured vehicle over the verification distance and, as a result of this check, either triggers the printing of the measured speed value or the cancellation of the measurement and the subsequent advance of the film.

Since the film is not advanced immediately after the camera has been triggered, the possibility arises of checking the measured speed value within the verification distance, which then results in a confirmation of the measured speed value or the cancellation thereof. By these measures, despite measurement and photography from the front, a measuring reliability is achieved when monitoring oncoming traffic as with measurement and photography from behind. Compared with the latter, however, the present invention produces the additional advantage of certain and clear identification of the driver of the vehicle.

BRIEF DESCRIPTION OF THE DRAWINGS

The foregoing and further objects and advantages of the present invention will be appreciated by those skilled in the art to which the invention pertains from the following detailed description when read in conjunction with the appended drawings, wherein.

Figure 1:
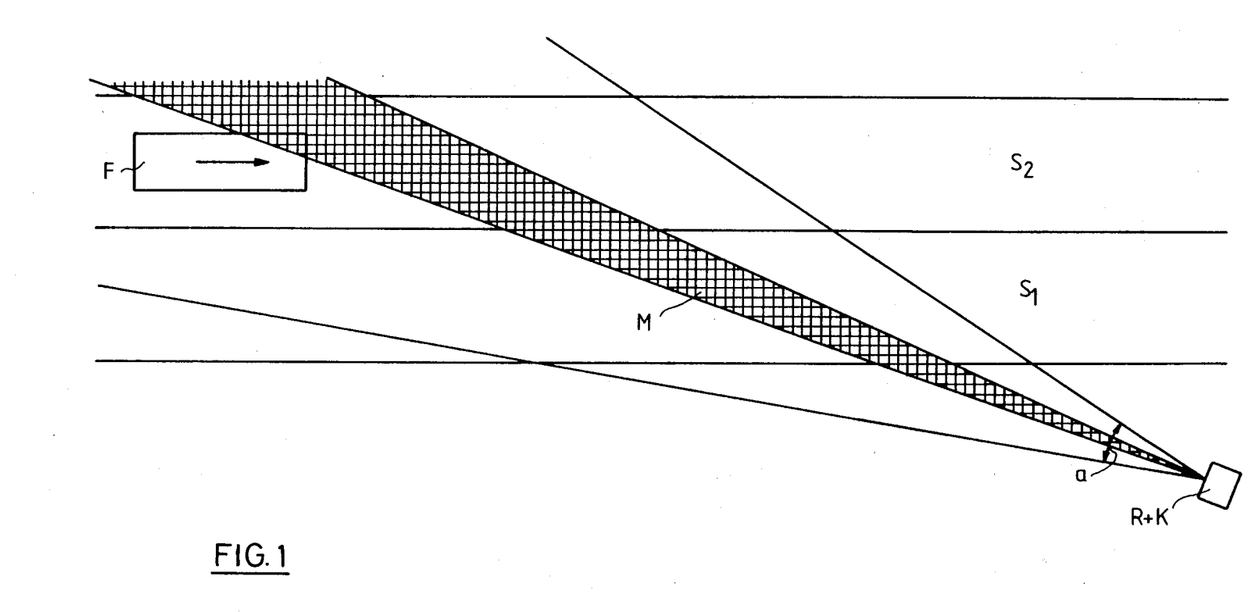
FIG. 1 is a schematic representation of the geometry of the arrangement of a device according to the invention on a two-lane highway.

FIG. 1 shows two lanes $S_1$ and $S_2$ of a road, for example one side of a dual two lane highway, with a vehicle F travelling in the direction the arrow in the passing lane $S_2$. To the side of the standard lane $S_1$, a radar device with a camera R+K is set up, which monitors oncoming traffic. The radar device emits the hatched measuring beam M and the camera has an angle of view a. The radar device and the camera R+K can be incorporated in a vehicle or be arranged on a stand. The measuring angle to the direction of travel is about 22°.

As soon as the front of the vehicle F, as shown in the drawing, enters the measuring beam M, it reflects the radar beam and an electric oscillation, the Doppler signal, is produced in the radar device in known manner by superimposing a portion of the incident energy with the received energy reflected by the vehicle. The frequency of the Doppler signal, the Doppler frequency, is proportional to the relative speed between the vehicle and the radar device. These actions are described in detail in German Patent No. 1 805 903 (U.S. Pat. No. 3,754,253), which is hereby incorporated by reference.

As soon as the Doppler frequency has stabilized after the vehicle F has entered the measuring beam M during a specific measuring stage, a measured speed value is determined and stored from the average of the Doppler frequency which remains stable during this measuring stage, in a manner similar to the process described in German Patent No. 1 805 903. As soon as the measured speed value exceeds a stored limit speed value for the maximum speed permissible at the measuring location, the camera is triggered and the vehicle is photographed from the front. The film, however, is not advanced at this point.

The Doppler frequency is then checked for its temporal behavior in relation to the previously recorded measured speed value. A tolerance range of, for example, ±3% based on this stored measured speed value is determined and time values are calculated from the measured speed value which correspond to certain track lengths which the vehicle F has covered. A track section, the so-called verification distance, of for example 3 meters in length is defined, within which the Doppler frequency should not deviate significantly from the stored measured speed value. A significant deviation is defined as the uninterrupted exceeding of the tolerance range over a distance exceeding a certain limit length of, for example, 1 meter. On the other hand, if the tolerance range is exceeded for a short period of time or falls short of these values, as can occur with each measurement even without the presence of additional vehicles in the measuring beam, the deviation is tolerated and does not result in the measurement being cancelled.

If no such significant deviations of the Doppler frequency from the stored measured speed value occur over the verification distance, then it is to be deduced that no further vehicles are present in the immediate proximity of the measured vehicle F, such that the allocation of the measured speed value to the previously photographed vehicle F is ensured. Only now is the measured speed value printed onto the photograph previously taken. The film is then advanced and the camera is ready for a new photograph to be taken.

If, over the verification distance, at least one significant deviation of the Doppler frequency from the stored measured speed value occurs, then it is probable that several vehicles are simultaneously present in the measuring beam. Thus, a definite allocation of the measured speed value to one particular vehicle is impossible. Accordingly, the measurement is cancelled after the verification distance has expired, while a special cancellation indicator, for example two dashes "--" is printed on the photograph already taken instead of the measured speed value. The film is then advanced and the camera is ready for the next photograph to be taken.

The above-described actions will now be explained by means of two examples shown in FIGS. 2 and 3. Only the fronts of the vehicles in the measuring beam M are represented, the respective positions of which are marked for different points in time $t_1$ to $t_{18}$. Since the vehicles travel at varying speeds, the spacings between the individual points in time in the two lanes $S_1$ and $S_2$, corresponding to the distances travelled, vary in size. In other words, the vehicle for which the spacings between the individual points in time are larger travels faster. In FIGS. 2a and 3a, the speed diagrams of the traffic situations illustrated in FIGS. 2 and 3, respectively, are shown.

Figures 2, 2A:
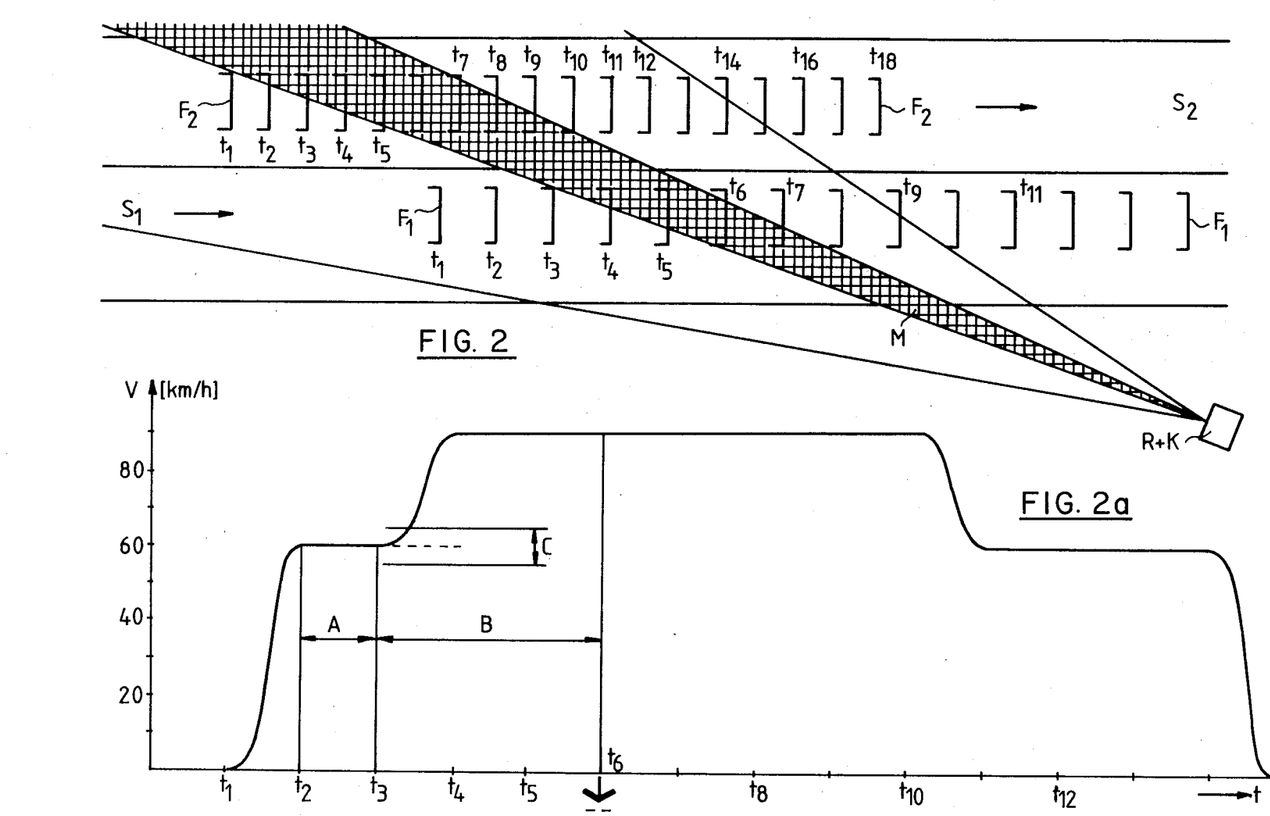
FIG. 2 is a diagram of a specific traffic situation with two vehicles in the measuring beam.
FIG. 2a illustrates a measured speed diagram for the traffic situation of FIG. 2.

FIG. 2 shows in the lane $S_2$ a slower vehicle $F_2$ which is being overtaken on the right in the lane $S_1$ by a faster vehicle $F_1$. The vehicle $F_2$ first travels into the measuring beam M at the point in time $t_1$ and triggers the measurement, the vehicle $F_1$ only reaches the measuring beam at the point in time $t_3$. During the time interval $t_2$ to $t_3$, which should correspond to the length of the measuring distance A, the Doppler frequency remains stable such that the following actions take place at the point in time $t_3$:

determination of the measured speed value and the storing thereof (it is assumed that the maximum permissible speed is less than 60 km/h).

determination of the tolerance range C, determination of the length of a significant deviation, determination of the length of the verification distance B, triggering of the camera.

Likewise at the point in time $t_3$, the vehicle $F_1$ enters the measuring beam M at a higher speed than the vehicle $F_2$. The Doppler frequency thus almost immediately leaves the tolerance range C, and not only temporarily, but over the total remaining length of the verification distance B. A significant deviation of the Doppler frequency from the stored measured speed value within the verification distance B is thus established. Therefore, at the end of the verification distance at the point in time $t_6$, a cancellation sign "--" is blended into the photograph already taken and the film is then advanced. The two vehicles $F_1$ and $F_2$ can be seen on the photograph, the spacing between them being so small that an allocation of the measured value is not possible.

Figures 3, 3A:
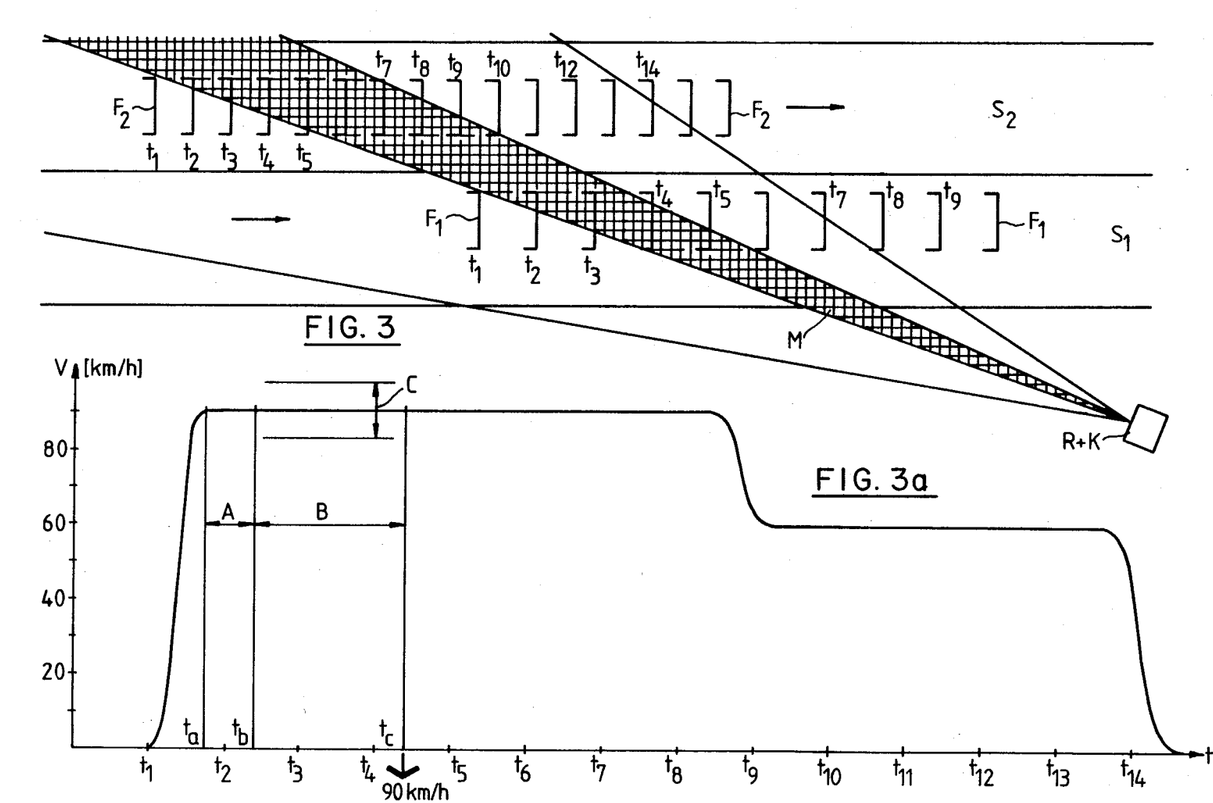
FIG. 3 is a diagram of another specific traffic situation with two vehicles in the measuring beam.
FIG. 3a illustrates a measured speed diagram for the traffic situation of FIG. 3.

In the example shown in FIG. 3, two vehicles $F_1$ and $F_2$ enter the measuring beam M at the same point in time $t_1$, the vehicle $F_1$ at a speed of about 90 km/h and the vehicle $F_2$ at about 60 km/h. The vehicle $F_1$ completely covers the vehicle $F_2$ such that the Doppler frequency immediately increases to the value for the vehicle $F_1$ and remains at this value until the rear of the vehicle $F_1$ leaves the measuring beam M shortly after the point in time $t_8$. The Doppler frequency then assumes a value corresponding to the speed of the slower vehicle $F_2$ which, however, does not prevent the successful measurement and registration of the vehicle $F_1$ in the lane $S_1$.

At the point in time $t_a$, the Doppler frequency reaches a value from which it does not substantially deviate before the point in time $t_b$ is reached, at which the measuring distance A ends, such that a reliable measured speed value can be formed over the measuring distance A based on the average value. With this measured speed value a tolerance range C and the length of the verification distance B are determined. Moreover, at the point in time $t_b$ after determining the measured speed value the camera is triggered, but the film is not yet advanced. Since the measured speed value is greater than in the example illustrated in FIG. 2, the tolerance range C is also larger and the time in which the measuring distance and the verification distance A and B are travelled through is correspondingly shorter.

Since the slower vehicle $F_2$ remains completely covered, even over the verification distance B, no significant deviations of the Doppler frequency from the stored measured speed value occur during the corresponding time span. Thus, at the end of the verification distance at the point in time $t_c$, the measured speed value 90 km/h is printed on the photograph already taken and the film is then advanced.

The photograph can be accurately evaluated even though two vehicles $F_1$ and $F_2$ can be recognized in it. Since a measured speed value and no cancellation indicator has been printed, it is evident that the rear vehicle $F_2$ has not decisively come into view. For if the vehicle $F_2$ has been travelling faster, then it would have influenced the Doppler frequency over the verification distance and significant deviations would have occurred, such that a cancellation indicator would have been printed.

The two traffic situations shown in FIGS. 2 and 3 are merely examples to explain the functioning and effects of the process according to the invention. Naturally, many other traffic situations are conceivable in which the process according to the invention can likewise be put to good use. The terms camera and film used in the description do not imply that the described process is restricted to today's conventional photographic films and cameras, rather they cover every conceivable recording and registering device and every medium suitable therefor. Thus, for example, electronic video cameras and magnetic tapes or floppy disks could also be used.

Figure 4:
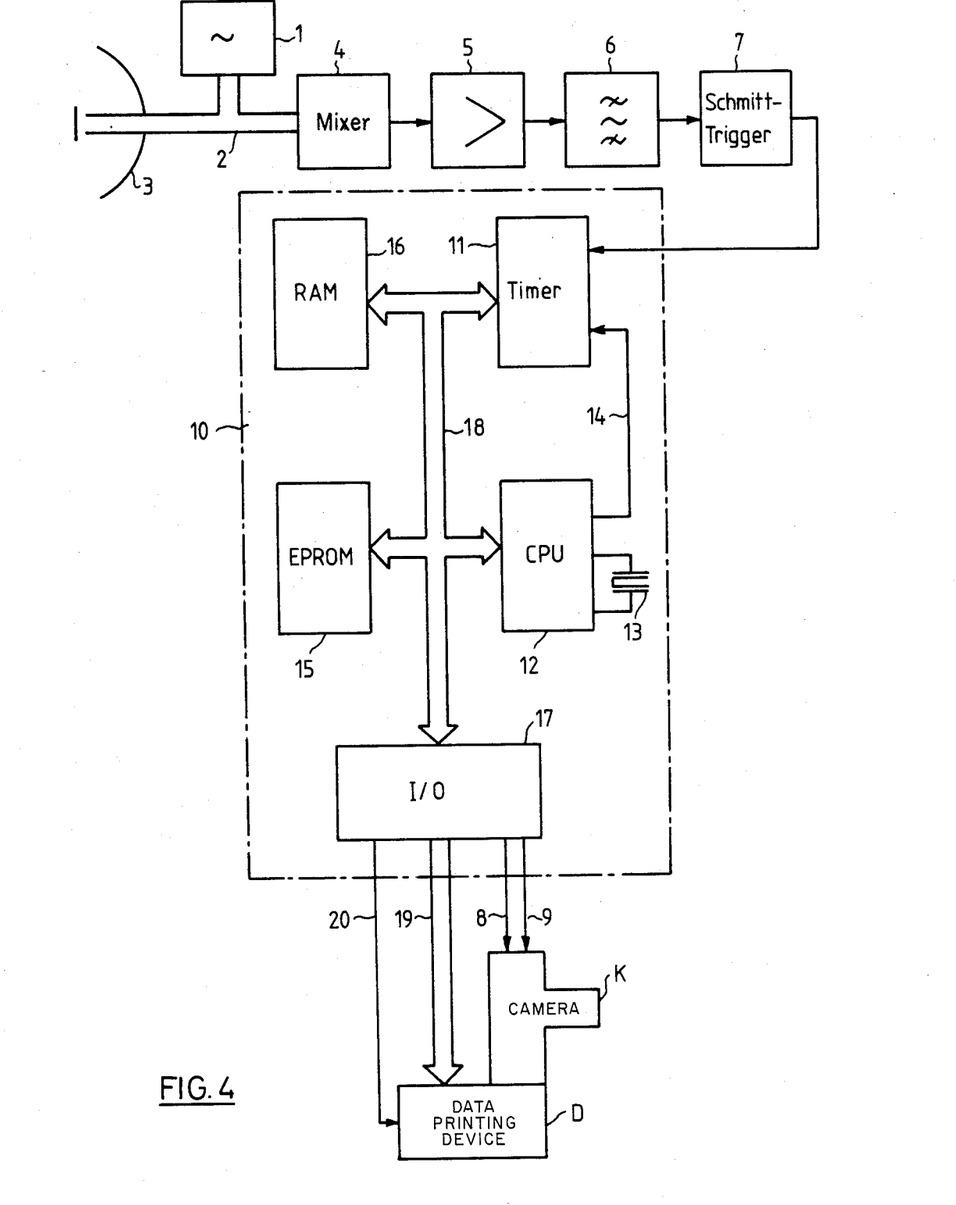
FIG. 4 shows a block diagram of the device according to the invention.

In FIG. 4 a block diagram of a device for carrying out the process according to the invention is shown. A microwave oscillator 1 produces a microwave signal which is supplied to an antenna 3 via a circular waveguide 2 and is radiated from the antenna in a beam. As soon as a vehicle travels through the radiation range of the antenna 3, radiation quantities are reflected by the vehicle to the antenna 3. These reflected radiation quantities are shifted in frequency relative to those originally radiated by the antenna 3 by an amount which is proportional to the speed of the vehicle. This phenomenon is described as the Doppler effect and the frequency change as the Doppler frequency.

The reflected radiation signals received by the antenna 3 are supplied through the waveguide 2 to a mixer 4, which also receives a small portion of the microwave signal originally produced by the microwave oscillator. The two signals are mixed in the mixer 4 and the mixed product resulting therefrom, a low frequency alternating voltage with the Doppler frequency, is input into an amplifier 5. The output signal of the amplifier 5 is supplied to the input of a filter 6 which only transmits the part of the spectrum which is of interest for further evaluation, that is the Doppler spectral component belonging to the speed measuring range of the radar device. The quantities of the noise voltage outside the penetration range of the filter 6 are thereby eliminated, such that the signal-to-noise ratio is improved. The signal occurring at the output of the filter 6 is then digitized by a Schmitt trigger 7.

The digital signal from the Schmitt trigger 7 contains a large amount of useful information about the speed of the objects moving in the radar beam. It is input to a timer 11 (for example INTEL 8253) belonging to a microcomputer 10, in which the time interval between the logic variations in the digitized Doppler signal is measured sequentially and is supplied to the microcomputer 11 for evaluation. In addition to the timer 11, the microcomputer contains a central processing unit (CPU) 12 (for example INTEL 8085) with a quartz crystal 13 which supplies a clock signal to the timer 11 through a connection 14, an erasable, programmable read-only memory (EPROM) 15 (for example INTEL 2764), a random access memory (RAM) 16 (for example INTEL 8185) and an input/output stage (I/O) 17 (for example INTEL 8255), which are all connected by a bus bar 18 for transferring data, addresses and control signals.

A registration camera with a data printing device D is controlled by the input/output stage 17. The camera K is connected to the input/output stage 17 by conductors 8 and 9 for the camera triggering signal or the film advance signal and the data printing device D is connected to the input/output stage 17 by means of a bus bar 19 for the data to be printed and a conductor 20 for the data print signal. The RAM 16 acts as a temporary store of variable data and of intermediate results and the EPROM 15 contains the program of the microcomputer 10 in binary code.

Figure 5A:
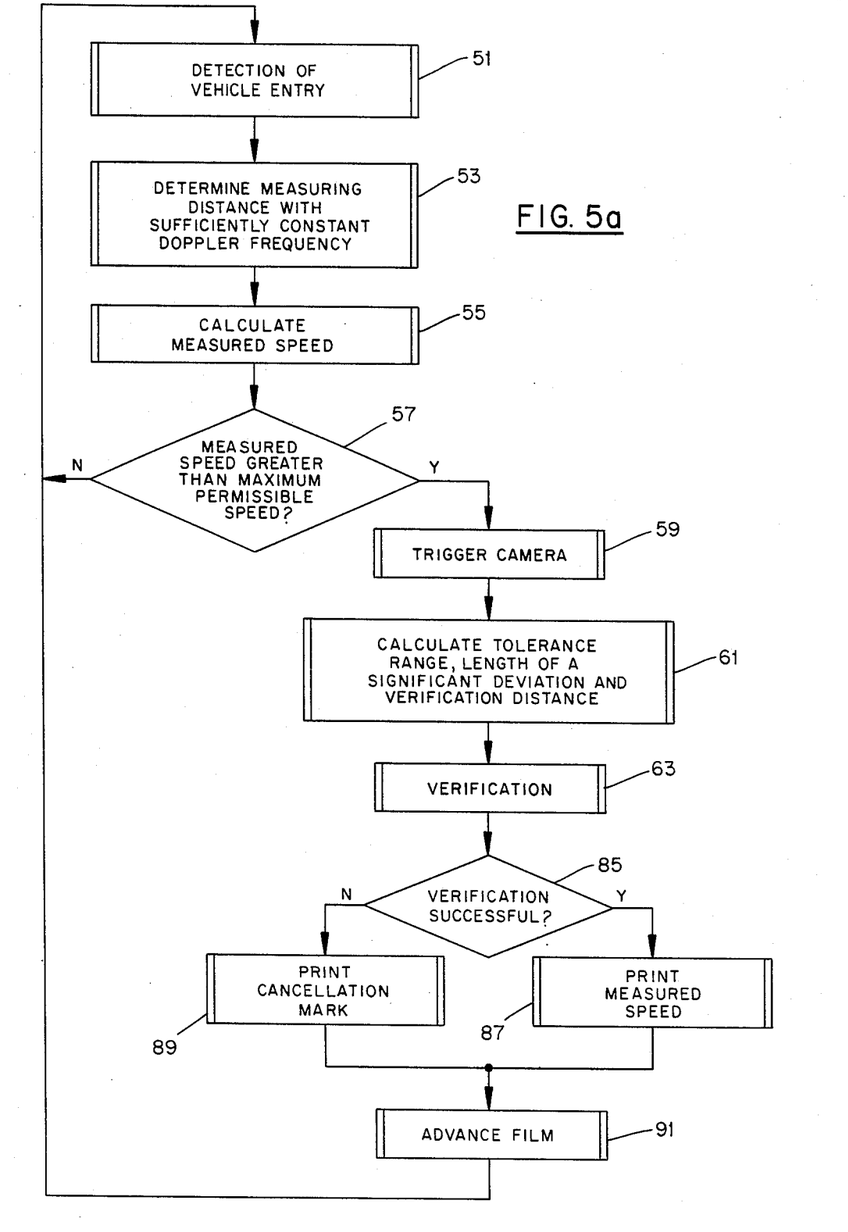
FIGS. 5a and 5b show a flow chart of a program of the microcomputer of the device in FIG. 4.

This program will now be described with reference to the flow chart represented in FIGS. 5a and 5b. As indicated by logic operation 51, a measuring process is introduced according to FIG. 5a with the detection of the entry of a vehicle F in the measuring beam M (FIG. 1). This entry can be determined by the occurrence of a series of level variations in the digital signal (entry timer 11, FIG. 4) with a minimum frequency after a period without level variation. After detecting the vehicle entry, the Doppler frequency is checked for constancy in logic operation 53 and after passage of a certain measuring distance with sufficiently constant Doppler frequency, the measured speed value is calculated in logic operation 55 based on the average value of the Doppler frequency in the measuring distance.

In accordance with logic operation 57, if the measured value is below the maximum permissible speed, then no photograph is taken and the detection of the entry of the next vehicle is awaited. If the measuring value exceeds the maximum permissible speed, then the camera is immediately triggered by logic operation 59 and the values required for carrying out the verification are calculated, as well as the tolerance range, the length of a significant deviation and the length of the verification distance in logic operation 61.

Figure 5B:
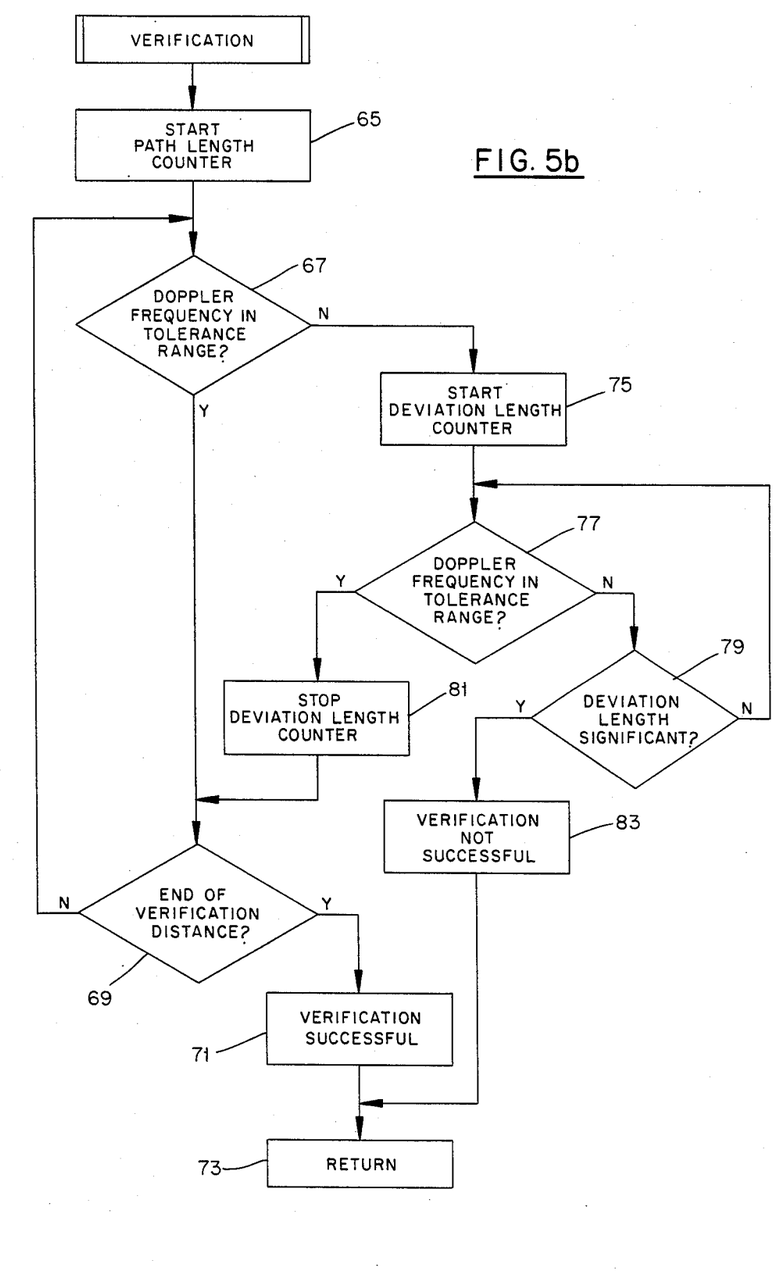

The verification indicated by logic operation 63 is represented separately in FIG. 5b. At the beginning of the verification, a path length counter contained in the timer 11 (FIG. 4) which measures the expired length of the verification distance is at logic operation 65. Logic operation 67 then checks whether the Doppler period last measured lies within the determined tolerance range. If this is the case, then the path length counter is thereupon tested at logic operation 71 to show whether the verification distance has already been passed. If this is not the case, then the next Doppler period is thereupon tested to show whether it lies within the tolerance range. If this also lies within the tolerance range then the path length counter is again tested and so on. If the Doppler frequency remains within the tolerance range over the total verification distance, then the verification is successfully completed at the end of this distance at logic operation 71 and control returns to the main program (FIG. 5a) through logic operation 73.

However, as soon as a Doppler period is measured with a length outside the tolerance range, the program branches off. As indicated by logic operation 75, a deviation length counter contained in the timer 11 (FIG. 4) is first started here, which should measure the length of the "deviation" which has just been detected, that is the time span over which the Doppler frequency lies outside the tolerance range. The length of the next Doppler period is then measured at logic operation 77. If this also lies outside the tolerance range, then the deviation length counter is tested at logic operation 79. If the actual deviation has not yet reached the length of a significant deviation then the length of the next Doppler period is measured.

This process is repeated until either a Doppler period is measured with a length within the tolerance range, or the deviation length counter has reached a count indicating a significant deviation. In the first case (Doppler frequency returns to tolerance area), the deviation length counter is set at zero at logic operation 81 and the verification routine continues, and in the second case (deviation length becomes significant) the verification is completed unsuccessfully at logic operation 83 and control returns to the main program (FIG. 5a) through logic operation 73.

In logic operation 85 the main program (FIG. 5a), in the case of a successful verification, the measured speed value is transferred into the data printing device D (FIG. 4) and the print signal is issued at logic operation 87. In the case of an unsuccessful verification, the cancellation indicator "--" is transferred to the data printing device and the print signal is likewise issued at logic operation 89. The film advance signal is then supplied to the camera K (FIG. 4) by logic operation 91 and the detection of the entry of the next vehicle is then awaited.

The principles, preferred embodiment and mode of operation of the present invention have been described in the foregoing specification. The invention which is intended to be protected herein, however, is not to be construed as being limited to the particular forms disclosed, since these are to be regarded as illustrative rather than restrictive. Variations and changes may be made by those skilled in the art without departing from the spirit of the invention.

What is claimed is:

1. A method for registering oncoming vehicles, comprising the steps of:
   determining a measured speed value of an oncoming vehicle with a radar speed measuring device, said measured speed value being determined during a measuring stage after a vehicle enters a measuring beam of said radar speed measuring device;
   producing a frontal record of said vehicle with a frontal recording device when said measured speed value exceeds a predetermined threshold value;
   checking said measured speed value to verify an accurate speed measurement, said speed measurement being verified with measurements from said radar speed measuring device as the vehicle travels through a verification distance; and
   indicating the measured speed value on said frontal record produced by said frontal recording device, said indicating step following said checking step such that said measured speed value is indicated on said record only after said speed measurement is verified by said checking step.

2. The method of claim 1, including the step of indicating a cancellation mark on said frontal record when said speed measurement is unsuccessfully verified by said checking step.

3. The method of claim 2, wherein said frontal recording device includes a camera and said frontal record includes a frontal photograph of said vehicle recorded on photographic film, and including the step of advancing said film after either said measured speed value or said cancellation mark has been indicated on said film.

4. The method of claim 1, wherein said step of checking said speed measurement comprises verifying the measurement as the vehicle travels a verification distance at least equal to the distance travelled by said vehicle during said measuring stage.

5. The method of claim 4, wherein the step of determining said measured speed value comprises determining the measurement as the vehicle travels a distance of approximately 25 centimeters and wherein said step of checking said speed measurement comprises verifying the measurement as the vehicle travels a verification distance of approximately 3 meters.

6. The method of claim 4, including the step of indicating a cancellation mark on said frontal record when said speed measurement is unsuccessfully verified by said checking step.

7. The method of claim 6, wherein said frontal recording device includes a camera and said frontal record includes a frontal photograph of said vehicle recorded on photographic film, and including the step of advancing said film after either said measured speed value or said cancellation mark has been indicated on said film.

8. An apparatus for registering oncoming vehicles, comprising:
   a radar speed measuring device for determining a measured speed value of an oncoming vehicle during a measuring stage after a vehicle enters a measuring beam of said radar speed measuring device;
   recording means for producing a frontal record of said vehicle when said measured speed value exceeds a predetermined threshold value;
   means for checking said measured speed value to verify an accurate speed measurement said checking means verifying said speed measurement on the basis of measurements from said radar speed measuring device as said vehicle travels through a verification distance; and means for indicating said measured speed on said frontal record, said indicating means indicating said measured speed value on said frontal record only after said checking means verifies said speed measurement.

9. The apparatus of claim 8, wherein said indicating means comprises means for indicating a cancellation mark on said frontal record when said speed measurement is unsuccessfully verified by said checking means.

10. The apparatus of claim 9, wherein said recording means includes a camera and said frontal record includes a frontal photograph of said vehicle recorded on photographic film, said film being advanced after either said measured speed value or said cancellation mark has been indicated on said film.

11. The apparatus of claim 10, wherein said checking means comprises means for verifying the speed measurement as the vehicle travels a verification distance at least equal to the distance travelled by said vehicle during the determining of the measured speed.

12. The apparatus of claim 10, wherein said indicating means comprises a data printing device for printing either said measured speed value or said cancellation mark on said photograph.

13. The apparatus of claim 10, wherein said checking means includes a computer which monitors said measurements from said speed measuring device as the vehicle travels through said verification distance and which, in response to said measurements, triggers said printing device to print either the measured speed value or said cancellation mark on said photograph.

14. The apparatus of claim 13, wherein said computer includes a timer for measuring time intervals between variations in the measurements from said speed measuring device, a central processing unit, a memory for temporary storage of variable data and intermediate calculations, a permanent memory for storing a computer program for controlling said central processing unit, and an input/output device for providing control signals to said recording means and said indicating means.

15. The apparatus of claim 8, wherein said checking means includes a computer which monitors said measurements from said speed measuring device as the vehicle travels through said verification distance and which, in response to said measurements, triggers said indicating means to indicate said measured speed value on said record when said speed measurement is verified and, when the verification of said speed measurement is unsuccessful, to indicate a cancellation mark on said record.

16. The apparatus of claim 15, wherein said computer includes a timer for measuring time intervals between variations in the measurements from said speed measuring device, a central processing unit, a memory for temporary storage of variable data and intermediate calculations, a permanent memory for storing a computer program for controlling said central processing unit, and an input/output device for providing control signals to said recording means and said indicating means.

* * * * *